UNITED STATES PATENT OFFICE.

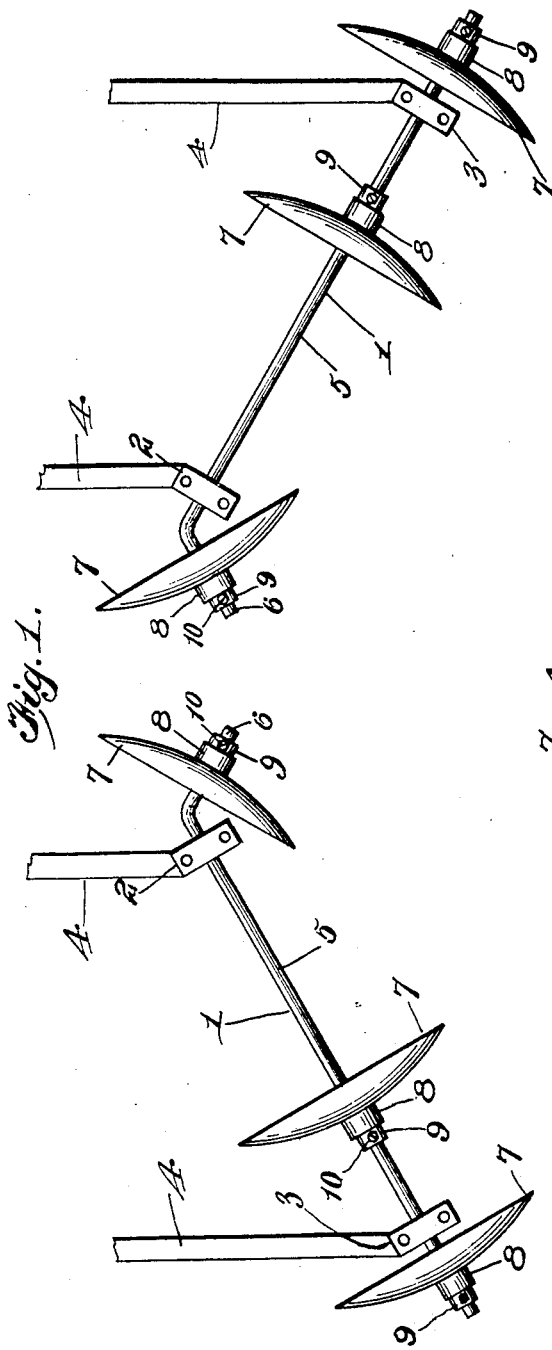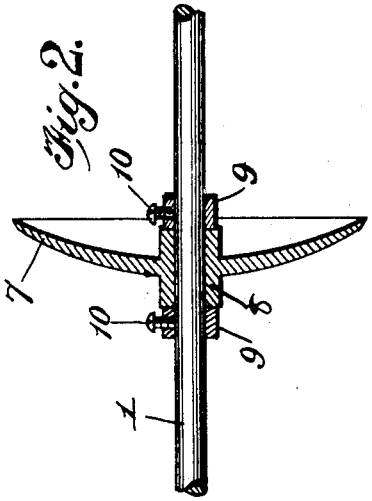

VERNICE M. MAYS, OF KETCHUM, OKLAHOMA.

PLOW.

1,397,841.  Specification of Letters Patent.  Patented Nov. 22, 1921.

Application filed January 3, 1919. Serial No. 269,403.

*To all whom it may concern:*

Be it known that I, VERNICE M. MAYS, a citizen of the United States, residing at Ketchum, in the county of Craig and State of Oklahoma, have invented new and useful Improvements in Plows, of which the following is a specification.

This invention relates to plows, the main object of the invention being to provide a novel arrangement of rotating plows of disk type together with novel means for mounting the same in relation to a cultivator frame or other frame similar thereto, the shafts of the disks being adjustable as to their angle in relation to the frame by which they are carried, enabling said disks to be operated at any desired angle with relation to the path of travel of the machine.

A further object of the invention is to so mount the disks upon their respective shafts that they may be adjusted relatively to each other to provide greater or less distance between them according to the nature of the soil, the crop to be cultivated or other conditions.

While the improved plow is particularly adapted for use in connection with cotton plants, it will be apparent as the description proceeds that the plow may be used for various other purposes which will suggest themselves.

With the above and other objects in view, the invention consists in the construction, combination and arrangement of parts, as herein described, illustrated and claimed:

In the accompanying drawings,

Figure 1 is a plan view of the plow showing the disks arranged for forcing the soil away from both sides of a row of plants, and as the device will appear when connected to the beams of a plow or cultivator frame.

Fig. 2 is a sectional view showing the manner of mounting each disk on its shaft.

The plow contemplated in this invention comprises a pair of shafts 1 which under normal working conditions diverge rearwardly with respect to the path of travel. Each of said shafts is provided with a plurality of clamps 2 and 3 by means of which it may be secured to the feet of the beams 4 of a plow or cultivator frame such as is ordinarily used in connection with cultivating shovels. Two or more of such clamps are employed in connection with each of said shafts and said clamps may be shifted longitudinally of their respective shafts to adapt them to be fastened to the beams of the cultivator or frame by which they are carried.

Each of the shafts 1 comprises relatively long and short arms or portions 5 and 6 and under different arrangements of said shafts, the shorter arms or portions 6 may be arranged either toward the center of the machine or toward the sides of the machine as indicated in Figs. 1 and 2 according to the work to be performed by the disks mounted thereon.

Under the arrangement illustrated in Fig. 1, a rotary disk 7 is journaled upon the shorter portion 6 of each shaft 1 and other disks 7 are journaled upon the longer arm or portion of each shaft, the first named disk being disposed at a reverse angle to the last named disks. The disks nearest the center of the machine, in rotating, serve to throw the dirt or soil away from a central row of plants straddled by the machine while the outer disks serve to throw such dirt or soil back, all the disks serving to loosen up the soil adjacent to both sides of the row of plants. Each of the disks comprises a hub 8 and collars 9 at opposite sides thereof secured to the respective shaft 1 by means of set screws 10. By adjusting the collars 9 with the aid of the set screws 10 the disks may be adjusted to any point or points in the length of the respective shaft and they may be also adjusted toward and away from each other for the purpose of varying the distance between the disks according to the nature of the soil and the work to be done.

It is to be understood, however, that my construction permits end-to-end reversal of the shafts so as to dispose the short angled ends or arms of the shafts outwardly and so that the longer arms or portions of the shafts will be disposed inwardly and extend toward the center of the frame. With this arrangement all the disks may be journaled on such longer arms or portions of the shafts and at such angles as to throw the dirt or soil toward the plants, this being a particularly useful feature of the invention in the cultivation of cotton plants. By adjusting the clamps 2 and 3 on the frame of the machine, the shafts 1 may be adjusted for greater or less shifting effect on the dirt or soil. The disks are also preferably of progressively increasing diameter from the center of the machine toward the opposite sides thereof, the outer disk operating more rapidly on the soil and the main disk operating with progressively decreasing rapidity on the soil. By reason of the construction described the soil may be cultivated closer to the row of plants than is possible with the ordinary shovel plows which are apt to injure the roots of the plants. The disks under the arrangement described may be used in conjunction with any kind of cultivator, walking, or riding, the device being especially valuable for plowing and cultivating cotton as it works with greater rapidity and is productive of better results than has been possible with the ordinary shovel plows and cultivators. It is also possible to adjust the disks upwardly or downwardly to give greater or less depth of penetration of the soil thereby greatly facilitating the plowing or cultivating operation.

I claim:—

1. In a disk plow, shafts arranged at the opposite sides of the longitudinal center of the plow and at diverging angles with respect thereto, each shaft having one of its end portions arranged at an angle to the body portion thereof, supports on the plow on which the shafts are mounted so as to permit end-to-end reversal of the shafts to dispose their angled ends either inwardly or outwardly, a series of disks mounted on each shaft, one disk of each series being adapted for revoluble mounting on the angular end of its shaft when said end is inwardly disposed, and each disk being independently revoluble on its shaft, each of said latter disks being arranged in reversed relation to the other disks of each series, and means for adjustably securing each disk on its shaft, the disks of each series being of gradually increasing diameter from the inner ends of the shafts outwardly.

2. A disk plow including shafts arranged at the opposite sides of the center of the plow and at diverging angles with respect thereto, each of said shafts having its inner end arranged at an angle to the body portion thereof, and a series of disks mounted on each shaft, one disk of each series being mounted on the angular end of the shaft in reversed relation with respect to the other of said disks.

In testimony whereof I affix my signature.

V. M. MAYS.